United States Patent

[11] 3,615,627

| [72] | Inventor | John B. Rust |
| | | Los Angeles, Calif. |
| [21] | Appl. No. | 699,368 |
| [22] | Filed | Jan. 22, 1968 |
| [45] | Patented | Oct. 26, 1971 |
| [73] | Assignee | Hughes Aircraft Company |
| | | Culver City, Calif. |

[54] PHOTOPOLYMERIZABLE COMPOSITIONS AND PROCESS OF MAKING SAME
9 Claims, No Drawings

[52] U.S. Cl. ......................................................... 96/115, 204/159.23
[51] Int. Cl. ......................................................... G03c 1/68
[50] Field of Search ............................................ 96/115; 204/159.24, 159.23; 260/526 U, 429, 431, 432, 435

[56] References Cited
UNITED STATES PATENTS

| 2,833,745 | 5/1958 | Fikentscher | 260/526 U |
| 2,989,455 | 6/1961 | Neugebauer | 204/158 |
| 3,097,096 | 7/1963 | Oster | 96/30 |
| 2,875,047 | 3/1959 | Oster | 96/35 |
| 3,346,383 | 10/1967 | Baxendale et al. | 204/159.24 |

Primary Examiner—Norman G. Torchin
Assistant Examiner—Edward C. Kimlin
Attorneys—James K. Haskell and Alton V. Oberholtzer ABSTRACT: The embodiment of this disclosure provides for the method of preparing improved photopolymerizable noncrystalizing resinous film material and particularly of polyvalent metal salts of acrylic and methacrylic acids, and the products thereof.

PHOTOPOLYMERIZABLE COMPOSITIONS AND PROCESS OF MAKING SAME

This invention relates to improved photographic film material of photopolymerizable resinous film compositions and method of producing the same. More particularly, the invention relates to the method of preparing improved compositions of photopolymerizable polyvalent metal salts of acrylic and methacrylic acids, and products thereof.

The phenomenon of forming photographic images characterized by the formation of polymer particles due to photo induced polymerization of polymerizable compounds has been known in the art for many years. However, there has been the continuing problems of forming improved film compositions and enhancing photographic speed. Acrylic acid material has appeared most suitable. However, may of the polyvalent metal salts of acrylic and methacrylic acids have a limited solubility in water at room temperature and therefore are apt to crystallize before the desired photopolymerization can be effected. Consequently, in high concentrations, difficulty is often encountered from precrystallization before photopolymerization occurs. Thus, the preparation of desired and suitable high-content acrylate photographic films, in the wet or cast state, without normal or condensation crystallization therein has been a problem. That is, with or without the removal of water, the highly concentrated metal acrylates have tendency to crystallize, or otherwise sometimes become unstable after preparation and standing before use.

It is accordingly an object of this invention or improvement to provide the art with new knowledge and teachings to overcome the above problems therein.

Another object of this invention is to provide the art with the discovery of my improvements in the method of preparing improved, more stable, light-sensitive photographically polymerizable resinous material, and the products thereof, which uniformly serve as stable noncrystallizing carriers of light-activable catalyst systems subject to photopolymerization.

It is another object of this invention to provide the photographic art with novel highly concentrated noncrystalline mixtures of polyvalent metal salts of acrylic acid and methacrylic acid specifically suitable for photopolymer photographic processes in the form of dry, glassy, amorphous, noncrystalline films, when mixed with or containing a catalyst system inactive in the absence of light and activated by light.

Another object of this invention is to provide the art with a method of making stable, supersaturated, photosensitive noncrystalline compositions of polyvalent metal acrylates having incorporated therewith a photosensitive polymerization catalyst system for polymer image reproduction and the products thereof.

An additional object of this invention is to provide the art with improved photosensitive polymerizable mixed metal acrylate compositions which, in highly concentrated forms, do not crystallize from solution and have enhanced photographic speed in photopolymerization processes while providing greater photosensitivity and efficiency and possessing a higher refractive index.

Further objects and advantages will become apparent from the following nonlimiting details of disclosure illustrating and describing my invention or improvements in providing the noncrystallizing photosensitive film materials embodied herein. Such film materials are adapted to be utilized with reference to providing photographic films having embodied therein a photosensitive catalyst as known to the art and more particularly and preferably the photoredox catalyst systems, with or without modification, and fixing a photopolymer image as disclosed and embodied in my copending applications and the following applications. Such systems and modifications are provided in application Ser. Nos. 483,986, (now abandoned and replaced by Ser. No. 824,902, 450,397, (now abandoned and replaced by Ser. No. 824,903, 583,649, 583,653, 583,696, 616,599 and Ser. No. 616,587 of John B. Rust, respectively. The compositions and processes therein are incorporated herein by reference thereto for application and use with the photosensitive film materials embodied in the present disclosure.

In addition, the noncrystalline compositions as provided herein are likewise applicable to the products and processes as disclosed in the applications of Leroy J. Miller and John B. Rust; Ser. Nos. 583,650 and 583,652, and John D. Margerum's Ser. No. 583,651, likewise included herein by reference thereto. Thus, modifications utilizing the described components and systems described and embodied therein with the herein described and embodied noncrystalline photopolymerizable polyvalent metal salts of acrylic and methacrylic acids which do not crystallize from aqueous solutions even when highly concentrated, are embodied herein.

In general, as indicated, the polyvalent metal salts of acrylic and methacrylic acid and derived from metal oxides, metal hydroxides, metal carbonates, and mixtures of the same, have only a limited solubility in water, and when the solutions are concentrated beyond a certain point, crystallization occurs. As provided in the above applications, it is disclosed therein that barium diacrylate possesses a fair solubility in water, for example, at room temperature, thus providing solutions thereof of higher solids content. While such solutions permitted the development of photographically more sensitive photosensitive films, the more highly concentrated solutions, for commercial production, are found to be unstable, sometimes spontaneously crystallizing after preparation and compounding. With the improvement thereof as provided herein, more consistently stable compositions using barium diacrylate as the sole polyvalent metal component in highly concentrated metal acrylate-photoredox photosensitive compositons are now possible. Other of the metal acrylates are of lesser or more limited solubility and the more particular embodiment herein is to provide noncrystallizing film compositions thereof in high and oversaturated concentrations, without any sign of crystallization or precipitation.

For example, lead diacrylate normally has only limited solubility in water as has also cadmium diacrylate, neodymium triacrylate and strontium diacrylate. I have found, however, that when added to barium diacrylate solution, the mixed polyvalent metal acrylate solution which results can be made in high concentration without any sign of crystallization or precipitation. Furthermore, the same and other mixed polyvalent metal acrylate solutions, as described above, can be cast into films and dried to amorphous, noncrystalline, glasslike films. Also, when dried to a water-free condition in bulk, the mixed polyvalent metal acrylate produces a glassy, amorphous noncrystalline solid.

I have also found that although lead diacrylate crystallizes out of a 25% wt./vol. solution and mercuric diacrylate likewise crystallizes out of a 25% wt./vol. solution, that a solution containing about equal parts of lead diacrylate and mercuric diacrylate in a 25% wt./vol. solution is perfectly stable and does not crystallize when stored for an indefinite period of time at room temperature. Somewhat different proportions allow solutions of still higher concentrations to be prepared. This finding is particularly important because it allows the preparation of concentrated photosensitive film compositions comprising a photoredox catalyst and lead-mercuric diacrylate. The lead-mercuric diacrylate produces an insoluble polymer having a refractive index greater than most polyvalent metal acrylate polymers. The efficiency of a colloidal particle for scattering visible light is a function of the refractive index of the particle relative to the medium in which it is embedded. Therefore, a polyvalent metal acrylate which yields a polymer whose refractive index is higher than some other given polyvalent metal acrylate will give photosensitive compositions of greater photographic speed, all other factors being equal. Lead and mercuric diacrylates give photopolymers of quite high refractive index. Although lead diacrylate has only limited solubility in water, the mixed lead and mercuric diacrylates may be made as substantially concentrated, noncrystallizing solutions which give copolymers of relatively high refractive index and consequently photosensitive compositions of greater photographic speed than, for instance, the sole use of barium diacrylate in photosensitive compositions. Such improved compositions thereof as provided herein, however, are also embodied herein.

The following examples are give to illustrate the process and compositions of the present invention so as to enable those skilled in the art to practice the same, or with other such like materials in the preparation of photosensitive resinous composition for producing noncrystallizing photosensitive films as contemplated and embodied herein:

EXAMPLE 1

To about 100 ml. of acrylic acid, there was added approximately 1 g. of activated carbon known to the trade as NUCHAR. The carbon was thoroughly suspended in the acrylic acid and allowed to stand at room temperature with stirring for several days. The acrylic acid was then filtered to remove the carbon.

157.5 g. of barium hydroxide octahydrate was ground to a fine powder in a mortar and partially dissolved and suspended in 135 ml. of distilled water in a 500 ml. round bottom flask. Seventy two ml. of the filtered acrylic acid were added through a dropping funnel over a period of about ¾ hour. After the addition of the acrylic acid, the nearly clear solution was allowed to stir for an additional 30 minutes. The slightly hazy solution was centrifuged yielding a clear, limpid solution of barium diacrylate having a concentration of 37.8 percent by weight.

EXAMPLE 2

About 100 ml. of acrylic acid were mixed with approximately 1 g. of activated carbon known to the trade as NUCHAR. The mixture was stirred at room temperature for about 6 days, then the carbon removed by centrifugation.

157.5 g. of barium hydroxide octahydrate was partially dissolved and suspended in 157.5 ml. of distilled water and 72 ml. of centrifuged acrylic acid added dropwise over a period of 30 minutes. The hazy solution was stirred and heated at 60°–80° C. for 3 hours, then divided into two equal parts. One part was filtered hot through a bed of filteraid known to the trade as CELITE to yield a clear, limpid noncrystallizing solution of barium diacrylate having a concentration of about 35.7 percent of weight. This solution is designated as solution A. The other part of the original solution was mixed with 4 g. of activated carbon known to the trade as NUCHAR and heated with stirring for an additional 30 minutes at 60°–80° C. The treated solution was then filtered hot through a bed of filteraid known to the trade as CELITE yielding a clear, limpid noncrystallizing solution of barium diacrylate having a concentration of about 35.7 percent by weight. This solution is designated as solution B.

EXAMPLE 3

157.5 g. of barium hydroxide octahydrate were ground to a fine powder in a mortar then suspended and partially dissolved in 157.5 ml. of distilled water in a 500 ml. round bottom flask. Seventy two ml. of acrylic acid were added slowly over a period of 30 minutes to the barium hydroxide and water with constant stirring. When all the acrylic acid had been added, the solution was heated to 65°–80° C. with stirring for 2 hours. Eight g. of activated carbon known to the trade as NUCHAR was then added and heating and stirring continued for an additional 20 minutes. The hot solution containing the activated carbon was filtered through a bed of filteraid known to the trade as CELITE, yielding a clear, limpid, noncrystallizing solution of barium diacrylate having a concentration of approximately 35.7 percent by weight.

EXAMPLE 4

157.5 g. of barium hydroxide octahydrate were partially dissolved and suspended in 157.5 ml. of distilled water IN a 500 ml. round bottom flask. Seventy-two ml. of freshly distilled acrylic acid were added dropwise over a period of 30 minutes to the stirred barium hydroxide and water. The hazy solution was then stirred and heated at 60°–80° C. for about 2 hours and, after this period, was divided into two equal parts. One part was filtered hot through a bed of filteraid known to the trade as CELITE yielding a clear, limpid, noncrystallizing solution of barium diacrylate having a concentration of about 35.7 percent by weight. This solution was designated as solution A. To the other part of the original solution was added 4 g. of activated carbon known to the trade as NUCHAR and the solution was stirred and heated at 60°–80° C. for an additional 30 minutes. This solution containing the activated carbon was then filtered hot through a bed of filteraid known to the trade as CELITE yielding a clear, limpid, noncrystallizing solution of barium diacrylate having a concentration of about 35.7 percent by weight. This solution was designated as solution B.

EXAMPLE 5

141.5 g. of barium hydroxide octahydrate were ground in a mortar to a fine powder and mixed and 11.1 g. of lead oxide (litharge, PbO). The mixture was partially dissolved and suspended in 157.5 ml. of distilled water and 72 ml. of acrylic acid were added dropwise with stirring over a period of 30 minutes. After all the acrylic acid had been added, the solution was stirred and heated at 60°–80° C. for a period of 2 178 hours. At this point, 8 g. of activated carbon known to the trade as NUCHAR was added and stirring and heating continued for an additional 20 minutes. The solution containing the activated carbon was filtered through a bed of filteraid known to the trade as CELITE yielding a clear, limpid, noncrystallizing solution of lead diacrylate and barium diacrylate having a concentration of approximately 37 percent by weight. Of the diacrylates present, the barium diacrylate is approximately 90 mole percent and the lead diacrylate is about 10 mole percent. A portion of this solution was distilled under vacuum at about 35° C. to remove water. The resulting concentrated solution was noncrystallizing clear, and had a viscosity that was somewhat higher than the original solution. The barium diacrylate-lead diacrylate mixture had the same mole percent composition, but the final solution had a concentration of approximately 71.5 percent of solids by weight.

EXAMPLE 6

126.2 g. of powdered barium hydroxide octahydrate was mixed with 22.3 g. of lead oxide (litharge, PbO). The mixture was partially dissolved and suspended in 146.7 ml. of distilled water and 72 ml. of distilled acrylic acid added dropwise with stirring over a period of 30 minutes. After all the acrylic acid had been added, the solution was stirred and heated at 60°–80° C. for 2 hours. At this point, 8 g. of activated carbon known to the trade as NUCHAR was added and stirring and heating continued for an additional 20 minutes. The solution containing the activated carbon was filtered hot through a bed of filteraid known to the trade as CELITE yielding a clear, limpid, noncrystallizing solution of barium diacrylate and lead diacrylate having a concentration of approximately 39.9 percent by weight. Of the diacrylates present, the barium diacrylate is approximately 80 mole percent and the lead diacrylate is about 20 mole percent.

When placed in a watch crystal and allowed to dry completely at room temperature by evaporation of the water, the composition remained clear throughout the drying period and formed a clear, amorphous, noncrystalline film which was hard and glasslike. In a mixture, before drying, was incorporated a photosensitive polymerization catalyst system (as hereinafter examplifed and when exposed to a photographic negative, reproduced the negative in photopolymer image form.

EXAMPLE 7

94.7 g. of powdered barium hydroxide octahydrate was mixed with 44.7 g. of lead oxide (litharge, PbO). The mixture was partially dissolved and suspended in 153.7 ml. of distilled water and 72 ml. of distilled acrylic acid added dropwise with stirring over a period of 30 minutes. After all the acrylic acid had been added, the solution was stirred and heated at 60°–80° C. for 2 hours. At this point, 8 g. of activated carbon known to the trade as NUCHAR was added and stirring and heating continued for an additional 20 minutes. The solution containing the activated carbon was filtered through a bed of filteraid known to the trade as CELITE. A clear, limpid solution was obtained while hot. The acrylate mixture contained 60 mole percent of barium diacrylate and 40 mole percent of lead diacrylate. When cooled to room temperature, the solution crystallized to a white pasty mass. From an inspection of the form of the crystals, it appeared that the lead diacrylate had been the major component to crystallize out of solution.

EXAMPLE 8

Using the barium diacrylated–lead diacrylate solution of example 5 consisting of 90 mole percent of barium diacrylate, and 10 mole percent of lead diacrylate and the barium diacrylate–lead diacrylate solution of example 7 consisting of 60 mole percent of barium diacrylate and 40 mole percent of lead diacrylate, a series of solutions were prepared by mixing the two above solutions to give a new solution containing different mole percentages of barium and lead diacrylates respectively. Each of the new solutions was stored and inspected at intervals and dried films of each of the new solutions were prepared by evaporation at room temperature. Table 1 gives the results obtained from the series of new solutions. Generally, it appears that noncrystallizing solutions can be prepared from the mixed diacrylates up to a mixture containing less than 40 mole percent of lead diacrylate. On the other hand, clear, amorphous, hard, glasslike dry films can only result from mixtures containing from 20 mole percent to 30 mole percent of lead diacrylate and 80 mole percent to 70 mole percent of barium diacrylate inclusive. These limits might be extended slightly by using an expanded series of the same and different metal acrylate mixtures.

TABLE I

| Mole percent | | | |
|---|---|---|---|
| Barium diacrylate | Lead diacrylate | Solution characteristics | Dry film characteristics |
| 100 | 0 | Non-crystalline to about 60% concentration. | Crystalline. |
| 90 | 10 | Non-crystalline to about 75% concentration. | Do. |
| 85 | 15 | ....do.... | Do. |
| 80 | 20 | Non-crystalline at all concentrations. | Non-crystalline, glass-like. |
| 75 | 25 | ....do.... | Do. |
| 70 | 30 | ....do.... | Do. |
| 65 | 35 | Non-crystalline to about 45% concentration. | Crystalline. |
| 60 | 40 | Crystallizes at about 35% concentration. | Do. |

EXAMPLE 9

126.2 g. of powdered barium hydroxide octahydrate was mixed with 12.9 g. of cadmium oxide powder. The mixture was partially dissolved and suspended in 146.7 ml. of distilled water and 72 ml. of acrylic acid added dropwise with stirring over a period of 30 minutes. After all the acrylic acid had been added, the solution was stirred and heated at 60°–80° C. for 2½ hours. At this point, 8 g. of activated carbon known to the trade as NUCHAR was added and stirring and heating continued for an additional 30 minutes. The solution containing the activated carbon was filtered hot though a bed of filteraid known to the trade as CELITE yielding a clear, limpid, noncrystallizing solution of barium diacrylate and cadmium diacrylates having a concentration of approximately 38.4 percent by weight. Of the diacrylates present, the barium diacrylate is approximately 80 mole percent and the cadmium diacrylate is about 20 mole percent. The final solution had a pH of about 8.

When this solution was dried at room temperature, a clear, hard, transparent glasslike, noncrystalline film was formed.

In order to determine the photographic properties of the above solution, a photoredox catalyst prepared from:

2.14 g. sodium p-toluenesulfinate dihydrate
  0.03 g. methylene blue
  100 ml. distilled water A photosensitive composition was prepared in the dark by mixing:

4 ml. Barium–cadmium diacrylate solution above
  1 ml. Photoredox catalyst solution above.

This composition was placed between two glass plates separated by a peripheral shim spacer 7 ml. thick to form a uniform film 0.18 mm. thick. This film was exposed to a spot of light having an intensity at the film surface of $10^{-2}$ watts/cm². The intensity of the light emerging from the back surface of the film was monitored with a photomultiplier tube and the electrical signal recorded on a strip chart recorder. From this data, the optical density of the photosensitive composition at the illuminated spot was calculated as a function of exposure time. The results are given in table 2.

TABLE 2

| | | Optical density | | | | | |
|---|---|---|---|---|---|---|---|
| | Induction period | 0.1 | 0.2 | 0.4 | 0.6 | 0.8 | 1.0 |
| Time (seconds) | 5.2 | 6.1 | 6.8 | 7.7 | 8.6 | 9.5 | 13.0 |

Similar and comparable results were obtained with the photosensitive composition containing the photosensitive catalyst and fixing material in this film form. Thus, illustrating that an illuminated image cast thereon is reproducible in polymer form, which can be fixed by modification as contemplated and provided herein.

EXAMPLE 10

126.2 g. of powdered barium hydroxide octahydrate was mixed with 16.8 g. of neodymium oxide. The mixture was partially dissolved and suspended in 146.7 ml. of distilled water and 72 ml. of acrylic acid added dropwise with stirring over a period of 30 minutes. After all the acrylic acid had been added, the solution was stirred and heated at 60°–80° C. for 2 1/2 hours. At this point, 8 g. of activated carbon known to the trade as NUCHAR was added and stirring and heating continued for 30 minutes. The solution containing the activated carbon was filtered hot through a bed of filteraid known to the trade as CELITE yielding a clear, pale purple, limpid, noncrystallizing solution of barium diacrylate and neodymium triacrylate having a concentration of approximately 40.7 percent by weight. Of the acrylates present, the barium diacrylate is approximately 80 mole percent and the neodymium triacrylate is about 20 mole percent. The solution had a pH of about 5.4 When the solution was poured in a watch crystal and dried at room temperature, a clear, hard, transparent, noncrystalline, photosensitive, glasslike film was secured.

In order to determine the photographic characteristics of the above solution, a photosensitive composition was prepared in the dark by mixing:

4 ml. Barium - neodymium acrylate solution above
1 ml. Photoredox catalyst solution described in example 9

This composition was exposed to light under the conditions described in example 9. The results of this example are given in table 3.

TABLE 3

| Induction period | Optical density | | | | | |
|---|---|---|---|---|---|---|
| | 0.1 | 0.2 | 0.4 | 0.6 | 0.8 | 1.0 |
| Time (seconds) ........ 5.2 | 6.4 | 7.2 | 8.2 | 9.2 | 10.5 | 12.4 |

EXAMPLE 11

126.2 g. of powdered barium hydroxide octahydrate were mixed with 14.8 g. of strontium carbonate. The mixture was partially dissolved and suspended in 158 ml. of distilled water and 72 ml. of acrylic acid added dropwise with stirring over a period of 30 minutes. After all the acrylic acid had been added, the solution was stirred and heated at 69°–80° C. for 4 1/2 hrs. At this point, 8 g. of activated carbon known to the trade as NUCHAR was added and stirring the heating continued for an additional 30 minutes. The solution containing the activated carbon was filtered hot through a bed of filteraid known to the trade as CELITE yielding a clear, limpid, noncrystallizing solution of barium diacrylate and strontium diacrylate having a concentration of approximately 36.8 percent by weight. Of the diacrylates present, the barium diacrylate is approximately 80 mole percent and the strontium diacrylate is about 20 mole percent. The solution had a pH of about 5.6. When the solution was poured into a watch crystal and dried at room temperature, a clear, hard, transparent, noncrystalline, photosensitive, glasslike film was secured.

When the compositions as disclosed herein were mixed with a photosensitive catalyst and dried, the films are photosensitive, as well as having the additional advantageous characteristics as indicated above.

In order to determine the photographic characteristics of the above solution, a photosensitive composition was prepared in the dark by mixing:

4 ml. Barium - strontium diacrylate solution above
1 ml. Photoredox catalyst solution described in example 9.

This composition was exposed to light under the conditions described in example 9. The results of this example are given in table 4.

TABLE 4

| Induction period | Optical density | | | | | |
|---|---|---|---|---|---|---|
| | 0.1 | 0.2 | 0.4 | 0.6 | 0.8 | 1.0 |
| Time (seconds) ........ 3.0 | 4.4 | 5.4 | 6.1 | 9.0 | 10.9 | 13.6 |

In noncrystalline dried film form the photosensitive composition reproduced a polymer image of an illuminated negative. As contemplated and provided herein, the polymer image can be fixed.

EXAMPLE 12

21.8 g. of powdered mercuric oxide were mixed with 22.3 g. of lead oxide (litharge, PbO). The mixture was suspended in 200 ml. of distilled water. It was necessary to carry out the entire process of this example in the dark. Thirty ml. of distilled acrylic acid were added dropwise with stirring over a period of 30 minutes. After all the acrylic acid was added, the solution was stirred and heated at 40° C. for 45 minutes. The solution was then filtered hot yielding a clear, limpid, noncrystallizing solution of mercuric diacrylate and lead diacrylate having a concentration of approximately 25 percent by weight. In contrast, lead diacrylate solutions of this concentration crystallize readily at room temperature. Of the diacrylates present, the mercuric diacrylate and the lead diacrylate are both approximately 50 mole percent. The solution had a pH of about 3.5.

In order to determined the photographic characteristics of the above solution, a photosensitive composition was prepared in the dark by mixing:

4 ml. Mercuric-lead diacrylate, solution above.
1 ml. Photoredox catalyst solution described in example 9

This composition was exposed to light under the conditions described in example 9. In addition, for purposes of comparison, the solution of barium diacrylate of example 4, solution A, was diluted to give a concentration of 25 percent by weight to be comparable to the solution of this example. A photosensitive composition using this diluted solution of barium diacrylate was prepared in the same manner as described above and exposed to light under the same conditions. Table 5 gives the results of this example.

TABLE 5

| | Induction period | Optical density | | | | | |
|---|---|---|---|---|---|---|---|
| | | 0.1 | 0.2 | 0.4 | 0.6 | 0.8 | 1.0 |
| Time in seconds for composition of Example 12 ........ | 2.7 | 3.8 | 4.4 | 5.5 | 6.8 | 7.9 | 9.0 |
| Time in seconds for diluted composition of Example 4 ........ | 5.8 | 8.2 | 9.5 | 13.0 | 16.1 | 19.5 | 23.0 |

Comparable results were obtained with the solution above, containing the photoredox catalyst system, when in noncrystalline dried film form. Upon exposure to an illuminated negative, the cast image therefrom was reproduced in polymer form in the film.

In the above examples, the activated carbon is illustrated of an activated absorbent. Other activated absorbents or sorbent material as the art has known since 1932, described in a footnote 109 on page 315, in the publication, "Technique of Organic Chemistry," Vol. 5, published by Interscience Publishers 1951, and known as activated silica, activated alumina, activated zeolite, silic acid and the like, and mixtures thereof, may be used. In addition, as illustrated in example 8, by table 1, it is some times advantageous to independently prepare separate metal acrylate solutions and then mix the separately prepared compositions as binary, tertiary, quatinary, or higher, mixtures to provide the clear, hard, transparent, noncrystalline, photosensitive, glasslike films.

Having described the present embodiments of my discovery in accordance with the Patent Statutes, it will now be apparent that some modifications and variations may be made without departing from the spirit and scope thereof. The specific embodiments described are provided by way of illustration and are illustrative of my discovery, invention, or improvements which are to be limited only by the terms of the appended claims.

What is claimed is:

1. The method of preparing an improved photosensitive stable, supersaturated, polyvalent metal acrylate composition of enhanced photopolymerizable photographic speed and useful in providing a stable noncrystallizing photosensitive film thereof having 25 percent or more polyvalent metal acrylate in photopolymerizable form comprising:

1. preparing a fresh clear batch of acrylic acid material selected from the group consisting of acrylic acid and methacrylic acid, and mixtures of said acids;
2. preparing a partially dissolved and suspended water mixture of powdered polyvalent metal material selected from the group consisting of polyvalent metal hydroxides, polyvalent metal oxides, polyvalent metal carbonates, and mixtures of the same;
3. mixing the said acrylic acid material of (1) and the water mixture of (2);
4. stirring the mixture at from room temperature to about 85° C. for a period of from about 1 hour to several days;
5. adding activated sorbent material to the mixture and continuing stirring;
6. filtering and separating the said sorbent from the mixture, and
7. recovering a clear, limpid, noncrystallizing solution of the metal acrylate present in an oversaturated concentration of at least 25 percent noncrystallized nonprecipitated polyvalent metal acrylate capable of producing a glassy amophous noncrystalline solid.

2. The method of claim 1 wherein the method of step 1 comprises:
1. suspending activated carbon in the said mixture of acrylic acid material;
2. maintaining the suspension at room temperature with stirring;
3. separating the acrylic acid material from the activated carbon, and
4. recovering the said acrylic acid material as a clear batch.

3. The method of claim 1 wherein the powdered metal material is barium hydroxide octahydrate.

4. The method of claim 1 wherein the powdered metal material is a mixture of barium hydroxide octahydrate and lead oxide.

5. The method of claim 1 wherein the powdered metal material is a mixture of barium hydroxide octahydrate and cadmium oxide.

6. The method of claim 1 wherein the powdered metal material is a mixture of barium hydroxide octahydrate and neodymium oxide.

7. The method of claim 1 wherein the powder metal material is a mixture of barium hydroxide octahydrate and strontium carbonate.

8. The method of claim 1 wherein the powdered metal material is a mixture of mercuric oxide and lead oxide.

9. The method of claim 1 including the steps of heating the mixed solution on the order of 60°–85° C. for a period of from about 2 hours to about 4½ hours and filtering the mixture.